April 14, 1936.  D. D. HUBBELL  2,037,327
OPHTHALMIC LENS AND METHOD OF MAKING THE SAME
Filed March 14, 1934  2 Sheets-Sheet 1

INVENTOR.
Daniel D. Hubbell.
BY
ATTORNEYS.

April 14, 1936. D. D. HUBBELL 2,037,327
OPHTHALMIC LENS AND METHOD OF MAKING THE SAME
Filed March 14, 1934 2 Sheets-Sheet 2

INVENTOR.
Daniel D. Hubbell.
BY
ATTORNEYS.

Patented Apr. 14, 1936

2,037,327

UNITED STATES PATENT OFFICE 2,037,327

OPHTHALMIC LENS AND METHOD OF MAKING THE SAME

Daniel D. Hubbell, Columbus, Ohio, assignor to Optical Research Corporation, New York, N. Y., a corporation of New York Application March 14, 1934, Serial No. 715,536

11 Claims. (Cl. 49—82.1)

My invention relates to ophthalmic lenses and method of making the same. It relates more particularly to single vision lenses, although it is not necessarily limited thereto, since there are certain features of my invention applicable to multifocal lenses.

There have been many attempts in the prior art to provide lenses that will protect the eyes from abnormally bright rays of light and particularly from strong rays of light passing through the edge of the lens and reflected across the lens. It has been found that light entering the edges or near the edges of the lens is internally reflected. The rays traveling by marginal reflection through the lens interfere with vision through the lens and are detrimental to visual acuity. There have been lenses designed in the past to overcome this difficulty. Such lenses usually embody a clear visual area having a colored or opaque area at the edge of the visual area designed to protect the visual area from marginal reflection and from bright rays of light which might strike the lenses near their edges. Most of these prior art lenses have been expensive to make and, therefore, have not gone into very extensive use. Another disadvantage of such prior art lenses resides in the fact that, in most instances, it is only possible to obtain a visual area of circular form. Furthermore, with most of these prior art lenses, the main visual field has been a very restricted area. Also, it has been difficult to provide a lens of this type with a distinct line of demarcation between the visual area and the colored or opaque area. Other disadvantages have also been possessed by lenses made in accordance with prior art methods.

One of the objects of my invention is to provide a lens of the type indicated which has a visual area completely protected from marginal reflection or from light rays striking the lens near the edge thereof which may be made very pleasing in appearance.

Another object of my invention is to provide a method of producing lenses of the type indicated which is extremely simple and may be easily performed so that lenses may be produced at a low cost.

Another object of my invention is to provide a method of producing lenses of the type indicated wherein the visual area may be of any desired size or shape and may be located at any desired position on the lens.

Another object of my invention is to provide such a method of producing lenses having substantial visual areas protected by opaque or colored areas that a sharp line of demarcation may be produced between the visual area and the colored or opaque area.

In its preferred form, my invention contemplates the production of a lens having a visual area which is composed of clear or slightly tinted glass. This visual area is preferably completely surrounded by an area of more deeply colored or tinted glass or even opaque glass. In other words, the lens is preferably of such a type that the light rays will more readily pass through the visual area than they will through the surrounding area. The surrounding area is adapted to protect the visual area from marginal reflection or from strong rays of light which strike the lens at or near the edge thereof. The line of demarcation between the surrounding area and the visual area is preferably sharp so that when the line of sight passes from one area it will immediately pass into the other area.

The method which I preferably use in forming lenses of the type indicated consists in fusing together in superimposed position a comparatively clear piece of flat glass and a piece of flat glass of the same index of refraction which is tinted or otherwise rendered more resistant to the passage of light rays therethrough. Thus, they form a laminated unit. This laminated structure is then molded to general concavo-convex form with an additional central concavo-convex protuberance. Then, the blank is ground away on both sides to such an extent that the relatively tinted part of the protuberance is eliminated while the clear glass thereof remains and is surrounded by a relatively opaque area that has been formed of the two layers of glass described. Thus, there is produced a main visual area and a surrounding visual area at the edge of the lens which is relatively more resistant to the passage of light rays and which, therefore, serves as a protection against marginal reflection and the like.

The preferred form of my method is illustrated in the accompanying drawings wherein similar characters of reference designate corresponding parts, and wherein.

Figure 1:
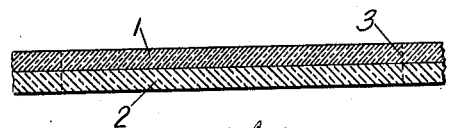
Figure 1 is a section showing two layers of glass superimposed on each other, one of these layers having greater light absorption properties than the other.

With reference to the drawings and, particularly, in Figures 1 to 9, inclusive, I have illustrated the manner in which I preferably produce lenses made in accordance with the principles of my invention. In Figure 1, I show a layer of glass 1, which is superimposed upon a second layer of glass 2. These layers of glass may be of any suitable thickness. The upper layer of glass 1 is suitable for covering the area which is to protect the main visual area from undesirable light rays entering through the edge of the lens or which strike near the edge thereof. This glass may be either deeply tinted or colored or opaque, or may even only be slightly tinted. However, the glass of this layer preferably possesses greater light absorptive properties than the layer of glass 2.

The layer of glass 2 is of a nature most suitable for the visual area. It may be either clear white or it may be slightly tinted. However, it is preferably of such a nature that the light rays will more readily pass through it than through the layer of glass 1. These layers of glass are preferably permanently joined together by a fusing or flashing process. However, if desired, they could be cemented together in a suitable manner.

I next take the laminated sheet of glass and mold it into the proper form. Before molding this piece, however, I preferably cut it into circular form and of desired shape, along the lines indicated by the dotted lines 3 in Figure 1. Then this laminated piece of glass, heated to a temperature which will permit the molding of it into the desired shape, is placed in a mold of the type shown.

Figure 2:
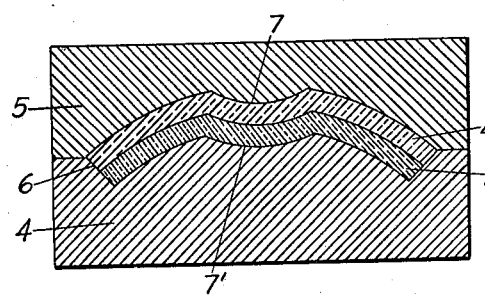
Figure 2 is a section of a mold showing how the layers of glass indicated in Figure 1 are molded into the desired shape.
Figure 7:
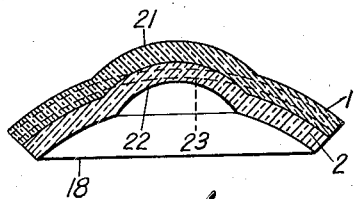
Figure 7 is a section illustrating the lens blank of Figure 6 after it is removed from the mold and, also, illustrating by dotted lines how the lens blank is to be subsequently ground.

In Figure 2, I show a mold which may be used for this purpose. This mold embodies a lower portion 4 and an upper cooperating portion 5. These two portions cooperate to produce a mold cavity 6 in which the blank will be shaped. The upper portion 5 has a downwardly depending central convex portion 7 which extends into the mold cavity 6. The lower portion of the mold has a concave portion 7' formed therein which aligns with the convex portion 7 when the two sections of the mold are superimposed.

Figure 3:
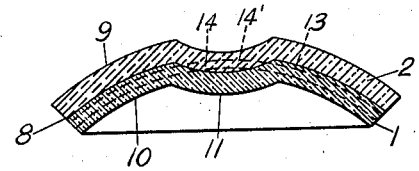
Figure 3 shows the lens blank after it has been taken from the mold, the glass having the greater light absorption properties being lowermost, and indicating by dotted lines how the lens blank is to be ground.
Figure 9:
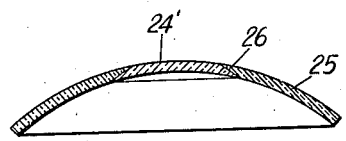
Figure 9 illustrates a finished lens produced from the lens blank shown in Figure 7.
Figure 5:
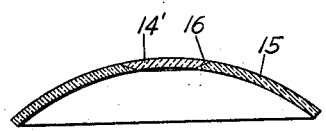
Figure 5 is a section showing the finished lens produced from the blank shown in Figure 3.

In Figure 2, the piece of glass is shown in the mold with the layer 2 thereof uppermost. When the glass is placed in this mold and the sections of the mold are brought to proper position relative to each other, the formed lens blank 8, Figures 3 and 5, is produced. It is apparent that this lens blank has a main convex upper surface 9 and a main concave lower surface 10. The curvatures of both these surfaces may be varied to meet requirements. Both surfaces are preferably curved to the same extent, although this curvature may be changed by variations in the curvatures of the walls of the concavity 6 formed in the mold.

The downwardly depending convexity 7 on the upper portion of the mold may be of any desired outline, depending on the outline desired for the visual area of the lens to be produced. This convex portion 7 may be of circular, oval or even substantially rectangular outline, if it is desired to produce a lens having a visual area of either of these outlines. Of course, this portion 7 might also be made of various other outlines. The portion 7 may depend any desired distance and may be of any suitable area, depending upon the visual area to be produced. Obviously, the curvature of this portion 7 may also be of any desired extent. The concavity 7' will be of substantially the same outline as the convexity 7 and will be designed for cooperation therewith.

As previously stated, the lens blank 8 produced in such a mold will have a main convex upper surface and a main concave lower surface. The cooperating convex and concave portions 7 and 7' of the mold will produce a downwardly extending convex projection 11 on the molded piece and a concavity 12 in the upper surface thereof. Of course, the convex portion 11, will have an outline determined by the portions 7 and 7' of the mold and will have a corresponding curvature. In Figures 3 and 5, the convex portion 11 is of circular outline. However, as previously stated, this portion may be of any desired outline, depending upon the desired outline of the main visual area to be produced in the lens.

In Figure 3, the dotted lines 13 ilustrate how the lens blank is to be ground in order to produce the finished lens. One side of the lens blank is preferably ground with a spherical curvature thereon. However, it will be apparent that this lens blank need not necessarily be made of spherical form, but could be molded with different curvatures and, during grinding, it would not be necessary to produce a spherical curvature thereon. As shown in Figure 3, both sides of the lens blank have the same curvature, although they may be made different from each other to suit the requirements of the patient. In this figure, it will be apparent that the upper side of the lens blank is ground away to such an extent that substantially all the layer 2 of clear glass is ground away, with the exception of a small portion 14 at the center of the blank. Also, part of the upper surface of the layer 1 of the colored glass or glass having greater light absorptive properties is ground away. The under side of the lens blank is ground away in such a manner that substantially all of the convex portion 11 formed of the colored glass is removed. Also, a portion of the surrounding area is removed.

When the lens blank is ground in the manner illustrated, a finished lens of the type indicated in Figure 5 will be produced. This finished lens will embody a centrally disposed visual area 14' which is completely surrounded by an area 15 of glass having greater light absorptive properties. The junction area between the areas 14' and 15, as indicated at 16, will preferably be at a comparatively flat angle. This is desirable so that there will be a sharp line of demarcation between the visual area and the surrounding area, with the result that when the line of vision leaves one of these areas it will almost immediately pass through the other area and will not have to pass through an intermediate area of any considerable extent.

It will be apparent that the inclination of the junction area 16 will depend upon the curvature of the projecting portion 11, the thickness of the layer 1 of the glass, and the extent to which this layer of glass is ground away. The extent of the area 14' may be varied, as will be apparent from Figure 3, in two ways. With the projecting portion 11 of a certain size, several areas 14' of various sizes could be produced from this single lens blank, depending upon the depth to which the upper surface of the lens blank or, more specifically, the upper surface of the layer 1 is ground. The deeper it is ground, the smaller in area will be the main visual area 14'. It could be ground in such a manner that the main visual area would be of very small size or, if desired, it could be made as great in area as the projecting portion 11. The other way in which the area 14' may be varied is by making the portion 11 greater in area. For example, these portions may be made so large that the main visual area 14' will have a very great extent and will be surrounded merely by a narrow band of protecting glass. In these particular figures, the main visual area 14' is shown as being at the center of the lens blank. However, it could be disposed at any desired location off-center of the lens blank. To do this, the projecting portion 11 would be formed off-center of the blank. This would require a mold where the portions 7 and 7' thereof were off-center of the mold cavity.

It will be apparent from Figure 5 that the junction area 16 extends from the upper surface of the lens inwardly towards the center thereof. In other words, the anterior surface of the main visual area 14' will be of slightly greater extent than the posterior surface thereof. However, if it is desired to obtain a junction area which is beveled in the opposite direction, or, in other words, a lens wherein the main visual area has an anterior surface of slightly less extent than the posterior surface, the steps illustrated in Figures 6 to 9, inclusive, are followed.

Figure 6:
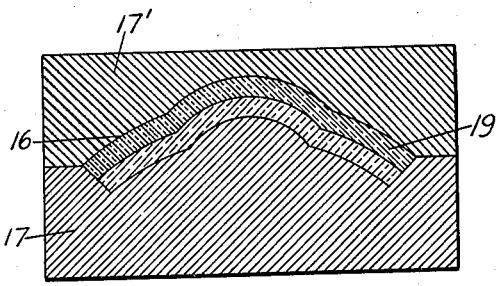
Figure 6 is a section of a mold which is used to produce a lens blank of a somewhat different form, the layer of glass having the greater light absorptive properties in this instance being the uppermost layer.

Thus, in Figure 6, I show a mold wherein the bottom portion will have the convexity 17 projecting upwardly into the mold cavity 16 and the concavity 17' will be formed in the upper cooperating section. These portions 17 and 17' will be of substantially the same nature as disclosed in the discussion of Figure 2. The lens blank 18 shown in this mold will have the layer 19 formed of glass having greater light absorptive properties uppermost.

When the lens blank is removed from the mold, it will have the convex portion 21 formed on its upper surface instead of the lower surface, as was the case of the lens blank illustrated in Figures 3 and 5. The concave portion 22 will be formed in the lower surface. The blank is then ground on both sides to an extent illustrated by the dotted lines 23 in Figure 7, similar to the manner in which the lens blank illustrated in Figure 3 was ground. A lens of the type illustrated in Figure 9 will be produced from this blank.

This lens embodies a main visual area 24', as before, which is surrounded by an area 25 of protecting glass. The junction area 26 between these two areas will also be at a comparatively sharp angle, as before. However, in this instance, this junction area will be inclined from the upper surface of the lens outwardly towards the outer edge thereof. In other words, the anterior surface of the area 24' will be slightly greater in extent than the posterior surface thereof. The only difference between these lenses will be in the direction of inclination of the junction area 26. The discussion with reference to the lens illustrated in Figure 4 will also apply to this lens shown in Figure 8.

In Figures 10 to 15, I show several lenses with main visual areas which may be produced by my method. I merely show these for illustrative purposes only and it will be apparent that visual areas of different outline and located differently than those shown may be produced.

Figure 8:
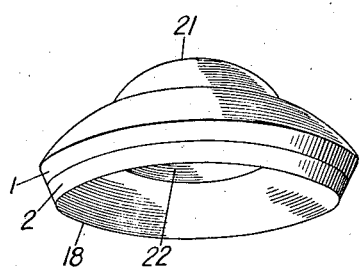
Figure 8 is a perspective view of the lens blank shown in Figure 7.
Figure 4:
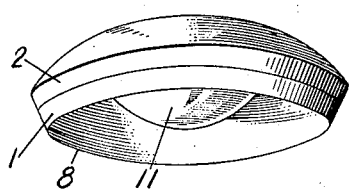
Figure 4 is a perspective view showing the blank removed from the mold.
Figure 10:
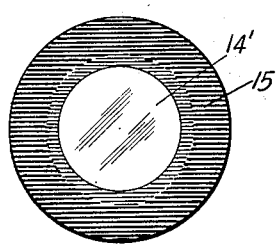
Figure 10 illustrates a finished lens having a main visual area of circular form arranged at the center of the lens and being surrounded by an area having greater light absorptive properties.

Figure 10 illustrates a type of lens similar to that illustrated in Figures 4 and 8. The main visual area is arranged at the center of the lens and is of circular form.

Figure 11:
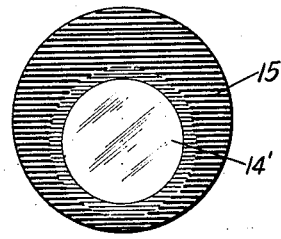
Figure 11 shows a lens with a main visual area similar to that of the lens of Figure 10, this visual area being arranged off-center of the lens.

Figure 11 illustrates a lens wherein the main visual area 14' is of circular form but is disposed below the center of the lens. With my method, this main visual area may be located on the lens as desired.

Furthermore, it need not be of circular form. Thus, in Figure 12, I show a lens wherein the main visual area is of noncircular form and is arranged below the center of the lens. It is surrounded by an area 15 of glass having greater light absorptive properties.

Figure 13:
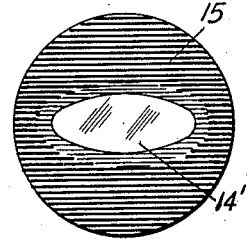
Figure 13 illustrates a lens which may be produced by my method, this lens having a main visual area which is of oval outline.

In Figure 13, I show a lens which may be produced by my method and which embodies a main visual area of substantially oval outline. This main visual area is shown as being substantially at the center of the lens but could be located at other positions, if desired.

Figure 14:
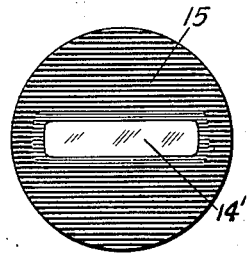
Figure 14 illustrates a lens made by my method and having a main visual area of substantially rectangular outline.

Figure 14 illustrates the lens which might be made by my method and which embodies a main visual area of substantially rectangular form which is disposed substantially at the center of the lens.

Figure 12:
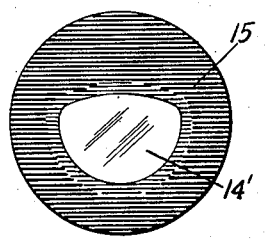
Figure 12 illustrates another lens which might be produced by my method, the main visual area being of non-circular outline.
Figure 15:
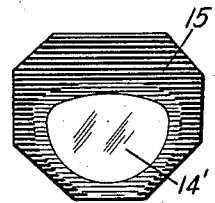
Figure 15 illustrates another lens which may be produced by my method, this lens having a main visual area similar in outline to that of Figure 12, the lens itself having a non-circular outline.

Figure 15 shows a lens having a main visual area like that illustrated in Figure 12, the lens itself being cut so that it is of substantially octagon shape.

It will be apparent from the description above that I have provided a lens having a main visual area which will be completely protected from marginal reflection or from strong light rays striking the lens near the edge thereof. This lens may be made quite pleasing in appearance.

The method which I have illustrated is very simple and may be easily performed and, consequently, lenses may be produced by it at a low cost. The method which I have illustrated is of such a type that lenses may be produced having any desired size of main visual area. This main visual area may also be of any suitable or desired shape. The method is of such a character that the main visual area may be located at the center of the lens or off-center, if desired. Furthermore, a sharp line of demarcation may be formed between the visual area and the area having greater light absorptive properties. The junction area may be inclined from the face of the lens outwardly towards its edge or it may be inclined from the face of the lens inwardly towards the center thereof.

Although I have described my lens as having a main visual area and a surrounding area having greater light absorptive properties than the main visual area, it will be apparent that this arrangement may be reversed, if desired. The main visual area may have the greater light absorptive properties.

Having thus described my invention, what I claim is:

1. A method of producing a lens with fields of vision of different light absorptive qualities which comprises forming a laminated unit from a layer of glass of one light absorptive quality and a layer of glass of a second light absorptive quality, displacing a portion of predetermined contour from the laminated unit thereby formed in such a manner that a portion of both layers of glass will be displaced, the portion which is displaced of one layer projecting into the plane of the portion which is not displaced of the second layer and being bordered thereby, and then grinding both sides of said laminated unit in such a manner that the displaced portion of the second layer is entirely removed and the displaced portion of the other layer which is bordered by the portion not displaced of the second layer will be exposed on both faces and the bordering portion of the second layer will also be exposed on both faces, thereby producing a lens having an inner field composed of glass of one light absorptive quality which extends through the entire thickness of the lens and an outer bordering field composed of glass of a different light absorptive quality which also extends through the entire thickness of the lens.

2. A method of producing a lens with fields of vision of different light absorptive qualities which comprises forming a laminated unit from a layer of glass of one light absorptive quality and a layer of glass of a second light absorptive quality, displacing a portion of predetermined contour from the laminated unit thereby formed in such a manner that a portion of both layers of glass will be displaced, the displaced portion lying wholly within the area of the laminated unit, the portion which is displaced of one layer projecting into the plane of the portion which is not displaced of the second layer and being surrounded thereby, and then grinding both sides of said laminated unit in such a manner that the displaced portion of the second layer is entirely removed and the displaced portion of the other layer which is surrounded by the portion not displaced of the second layer will be exposed on both faces and the surrounding portion of the second layer will also be exposed on both faces, thereby producing a lens having an inner field composed of glass of one light absorptive quality which extends through the entire thickness of the lens and an outer surrounding field composed of glass of a different light absorptive quality which also extends through the entire thickness of the lens.

3. The method of producing a lens with fields of vision of different light absorptive qualities which comprises forming a laminated unit from a layer of glass of one light absorptive quality and a layer of glass of a second light absorptive quality, displacing a portion of predetermined contour from the laminated unit thereby formed in such a manner that a portion of both layers of glass will be displaced so that a protuberance is formed on one side of the unit and a depression is formed in the other side of the unit, the portion which is displaced of one layer of glass projecting into the plane of the portion which is not displaced of the second layer of glass and being bordered thereby, and then grinding both sides of said laminated unit in such a manner that the displaced portion of the second layer is entirely removed and the displaced portion of the other layer which is bordered by the portion not displaced of the second layer will be exposed on both faces and the bordering portion of the second layer will also be exposed on both faces, thereby producing a lens having an inner field composed of glass of one light absorptive quality which extends through the entire thickness of the lens and an outer bordering field composed of glass of a different light absorptive quality which also extends through the entire thickness of the lens.

4. A method of producing a lens with fields of vision of different light absorptive qualtities which comprises forming a laminated unit from a layer of glass of one light absorptive quality and a layer of glass of a second light absorptive quality, molding the entire laminated unit thereby formed into concavo-convex form and in such a manner as to displace a portion of predetermined contour therefrom and thereby causing a portion of both layers of glass to be displaced, the portion which is displaced of one layer projecting into the plane of the portion which is not displaced of the second layer and being bordered thereby, and then grinding both sides of said laminated unit in such a manner that the displaced portion of the second layer is entirely removed and the displaced portion of the other layer which is bordered by the portion not displaced of the second layer will be exposed on both faces and the bordering portion of the second layer will also be exposed on both faces, thereby producing a lens having an inner field composed of glass of one light absorptive quality which extends through the entire thickness of the lens and an outer bordering field composed of glass of a different light absorptive quality which also extends through the entire thickness of the lens.

5. A method of producing a lens with fields of vision of different light absorptive qualities which comprises forming a laminated unit from a layer of glass of one light absorptive quality and a layer of glass of a second light absorptive quality which are fused together, subjecting the laminated unit thereby formed to heat and pressure in order to produce a displaced portion of predetermined contour from the unit thereby displacing a portion of both layers of glass, the portion which is displaced of one layer projecting into the plane of the portion which is not displaced of the second layer and being bordered thereby, and then grinding both sides of said laminated unit in such a manner that the displaced portion of the second layer is entirely removed and the displaced portion of the other layer which is bordered by the portion not displaced of the second layer will be exposed on both faces and the bordering portion of the second layer will also be exposed on both faces, thereby producing a lens having an inner field composed of glass of one light absorptive quality which extends through the entire thickness of the lens and an outer bordering field composed of glass of a different light absorptive quality which also extends through the entire thickness of the lens.

6. A method of producing a lens with fields of vision of different light absorptive qualities which comprises forming a laminated unit from a layer of glass of one light absorptive quality and a layer of glass of a second light absorptive quality which are fused together, subjecting the laminated unit thereby formed to heat and pressure so that the entire unit is shaped into concavo-convex form and so that a portion thereof is displaced to cause displacement of both layers of glass and to produce a protuberance on one side of the unit and a depression in the opposite side thereof, the displaced portion lying wholly within the area of the laminated unit, the portion which is displaced of one layer projecting into the plane of the portion which is not displaced of the second layer and being surrounded thereby, and then grinding both sides of said laminated unit in such a manner that the displaced portion of the second layer is entirely removed and the displaced portion of the other layer which is surrounded by the portion not displaced of the second layer will be exposed on both faces and the surrounding portion of the second layer will also be exposed on both faces thereby producing a lens having an inner field composed of glass of one light absorptive quality which extends through the entire thickness of the lens and an outer surrounding field composed of glass of a different light absorptive quality which also extends through the entire thickness of the lens.

7. A method of producing a lens with a plurality of fields of different light absorptive qualities which comprises forming a laminated unit from layers of glass of different light absorptive qualities, molding the laminated unit thereby formed into concavo-convex form and to produce a protuberance thereon, and grinding the unit so molded to eliminate the protuberance.

8. A method of producing a lens with a plurality of fields of different light absorptive qualities which comprises forming a laminated unit from layers of glass of different light absorptive qualities, molding the laminated unit thereby formed into concavo-convex form and in such a manner as to produce a convex protuberance on one side of the unit and a concave depression in the other side of the unit, and grinding the unit so molded on both sides.

9. A lens blank for use in producing a lens having a plurality of fields of vision of different light absorptive qualities comprising layers of glass of relatively different light absorptive qualities joined together to form a laminated unit, said laminated unit being of concavo-convex form and having a portion thereof displaced.

10. A lens blank for use in producing a lens having a plurality of fields of vision of different light absorptive qualities comprising layers of glass of relatively different light absorptive qualities joined together to form a laminated unit, said laminated unit being of concavo-convex form and having a portion thereof displaced so that a protuberance is formed on one side of the unit and a depression is formed in the opposite side of the unit.

11. A lens blank for use in producing a lens having a plurality of fields of vision of different light absorptive qualities comprising layers of glass of relatively different light absorptive qualities joined together to form a laminated unit, said laminated unit being of concavo-convex form and having a portion thereof displaced so that a convex protuberance is formed on one side of the unit and a concave depression is formed in the opposite side of the unit, the displaced portion of the unit lying wholly within the area thereof.

DANIEL D. HUBBELL.